US 11,509,791 B1

(12) United States Patent
Gopalakrishnan et al.

(10) Patent No.: US 11,509,791 B1
(45) Date of Patent: Nov. 22, 2022

(54) METHODS AND SYSTEMS FOR AUTOMATICALLY IDENTIFYING IR SECURITY MARKS IN A DOCUMENT BASED ON HALFTONE FREQUENCY INFORMATION

(71) Applicant: XEROX CORPORATION, Norwalk, CT (US)

(72) Inventors: Sainarayanan Gopalakrishnan, Chennai (IN); Rajasekar Kanagasabai, Chennai (IN); Haripriya Chandran, Kulathur Chai (IN)

(73) Assignee: Xerox Corporation, Norwalk, CT (US)

( * ) Notice: Subject to any disclaimer, the term of this patent is extended or adjusted under 35 U.S.C. 154(b) by 2 days.

(21) Appl. No.: 17/391,190

(22) Filed: Aug. 2, 2021

(51) Int. Cl.
*H04N 1/32* (2006.01)
*G06V 10/22* (2022.01)
*G06V 10/75* (2022.01)
*G06V 30/40* (2022.01)
*G06V 30/10* (2022.01)

(52) U.S. Cl.
CPC ....... *H04N 1/32256* (2013.01); *G06V 10/235* (2022.01); *G06V 10/751* (2022.01); *G06V 30/40* (2022.01); *G06V 30/10* (2022.01)

(58) Field of Classification Search
CPC ............. H04N 1/32256; G06V 10/235; G06V 10/751; G06V 30/40; G06V 30/10
See application file for complete search history.

(56) References Cited

U.S. PATENT DOCUMENTS

| | | | |
|---|---|---|---|
| 8,064,102 B1 * | 11/2011 | Zhao | B42D 25/333 358/1.9 |
| 9,628,635 B1 | 4/2017 | Palanivel et al. | |
| 2012/0251715 A1 | 10/2012 | Dalal et al. | |

FOREIGN PATENT DOCUMENTS

WO   WO-2018224108 A1   12/2018

* cited by examiner

*Primary Examiner* — Christopher Wait

(57) ABSTRACT

The present disclosure discloses methods and systems for automatically detecting Infrared (IR) security mark based on unknown halftone frequency information. The method includes receiving a document from a user including an IR security mark. The document is scanned. Then, one or more halftone frequencies associated with the IR security mark portion are estimated. Based on the estimation, the IR security mark portion is classified into a background region and the IR marked region including the IR security mark. The IR security mark is extracted and pixels falling in the IR marked region are reconstructed to identify content in the IR security mark. Finally, the identified content is compared with one or more pre-stored IR security marks to ascertain the presence of the IR security mark in the document for further assessment. This way, the method automatically detects the IR security mark in the document.

21 Claims, 7 Drawing Sheets

METHODS AND SYSTEMS FOR AUTOMATICALLY IDENTIFYING IR SECURITY MARKS IN A DOCUMENT BASED ON HALFTONE FREQUENCY INFORMATION

TECHNICAL HELD

The present disclosure relates to the field of document security. More specifically, the disclosure relates to methods and systems for identifying IR security marks in a document based on unknown halftone frequency information.

BACKGROUND

In today's time, security of data is very important for every individual/user and/or organization. Organizations implement several techniques to protect confidential documents, for example, using watermarks, barcodes, OR codes, IR security marks and so on. Of these, protecting documents using IR security marks is very popular and offers an enhanced security such that it protects the documents copying, forging, and counterfeiting. In other words, IR security marks within the documents help prevent counterfeiting, illegal alteration, and/or duplication of the documents.

For example, a cheque issued by a bank to a user includes an IR security mark which may not be visible to the user or may only be visible using special scanners. When the user submits a filled-out cheque to the bank, the bank verifies that the cheque submitted by the user is an original cheque by detecting the IR security mark.

To read such security marks, special/dedicated devices such as IR scanners, IR cameras, or specific IR light is needed. The use of such dedicated devices to read IR marks may increase the overall cost, add dependency in the system and so on. For example, if an IR scanner is not functioning due to various reasons, then there is no way to detect/read IR marks in the documents. Moreover, a dedicated person is needed who manages the IR scanner for detecting IR marks in the documents. In this light, there is a need for improvised methods and systems to detect IR security marks.

SUMMARY

The present disclosure discloses a method for detecting Infrared (IR) security mark based on unknown halftone frequency information. The method detects the IR security mark using an existing device such as a multi-function device, The method includes receiving a document from a user including an IR security mark. The document is scanned. Then, one or more halftone frequencies associated with the IR security mark portion are estimated. Based on the estimated halftone frequencies, the IR security mark portion is classified into a background region and the IR marked region including the IR security mark. The IR security mark is identified, Then, the IR security mark is extracted and pixels falling in the IR marked region are reconstructed to identify content in the IR security mark. Finally, the identified content/IR security mark is compared with one or more pre-stored IR security marks to ascertain the presence of the IR security mark in the document for further assessment. This way, the method automatically detects the IR security mark in the document using the multi-function device.

According to further aspects illustrated herein, a multi-function device for automatically detecting Infrared (IR) security mark based on unknown halftone frequency information is disclosed. The multi-function device includes: an automatic document handler (ADH) for receiving a document from a user, including an IR security mark; a scanner for scanning the document; and IR security mark detection module for: estimating one or more halftone frequencies associated with the IR security mark portion; based on the check, classifying the IR security mark portion into a background region and the IR security mark region; identifying the IR security mark; identifying pixels falling in the IR security mark portion to identify the content in the IR security mark; and comparing the identified content with one or more pre-stored IR security marks to ascertain the presence of the IR security mark in the document for further assessment.

According to furthermore aspects illustrated herein, there is a method for method for automatically detecting Infrared (IR) security mark based on unknown halftone frequency information, the method is implemented at a multi-function device. The method includes receiving a document from a user including an IR security mark. A user interface is provided to a user to input a location of the IR security mark in the document. Then, the document including the IR security mark is scanned. Then, one or more halftone frequencies associated with the IR security mark portion are calculated. Based on the calculated halftone frequencies, the IR security mark portion is classified into a background region and IR security mark. The IR security mark from the IR security mark portion is identified. After this, pixels falling in the IR security mark are identified using one or more morphological operations, Then, an Optical Character Recognition (OCR) is performed on the identified pixels to identify the text in the IR security mark. The identified text is matched with one or more pre-stored IR security marks; and based on the matching, the presence of the of IR security mark in the document is successfully detected.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 2 is an exemplary overall method flowchart for identifying infrared (IR) security mark in a document, while

DESCRIPTION

Figure 1:
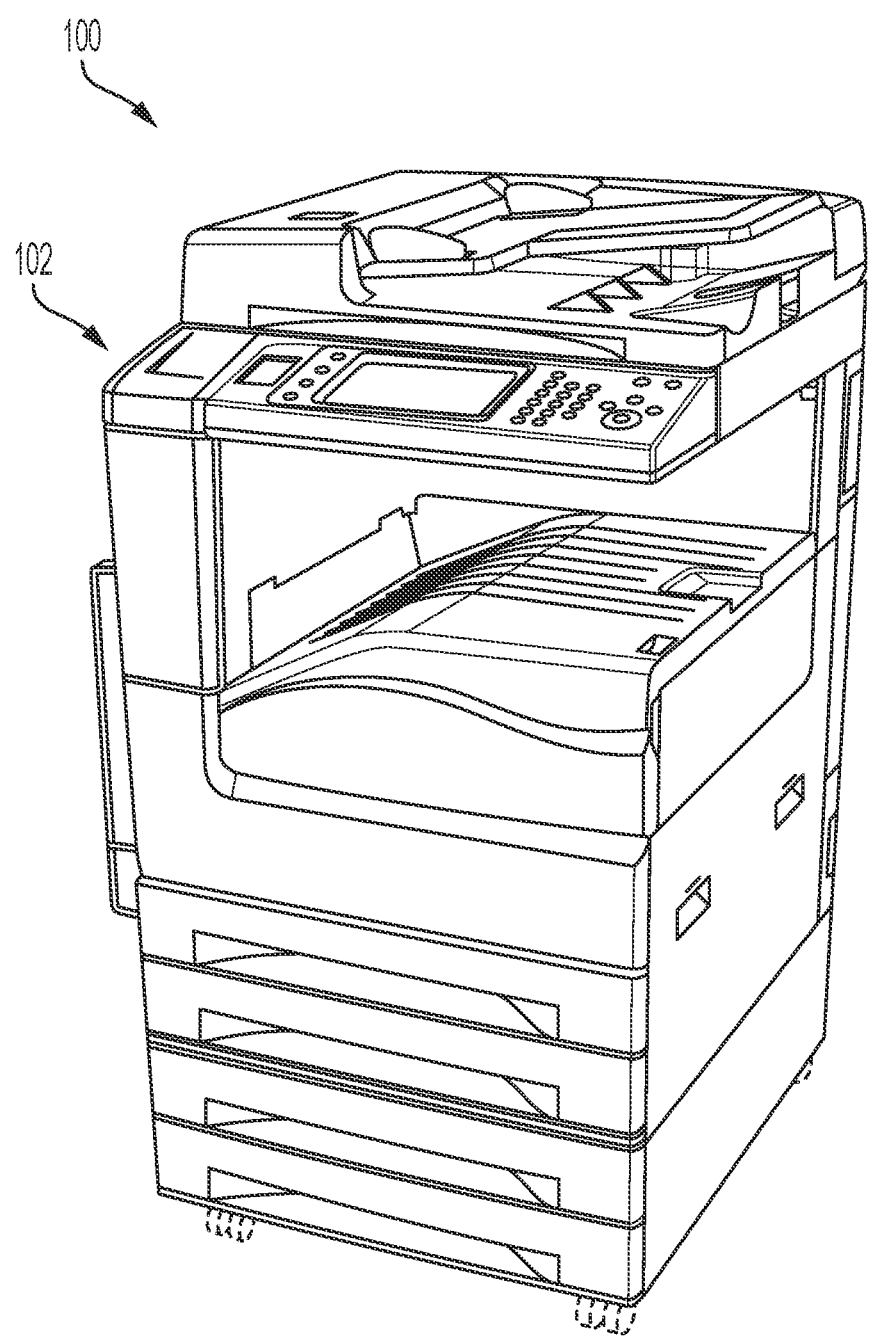
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below, The term "multi-function device" is a single device or a combination of multiple devices, to perform one or more functions such as, but not limited to, printing, imaging, copying, scanning, and so forth. The multi-function device may include software, hardware, firmware, or a combination thereof. In the context of the current disclosure, the multi-function device identifies IR security marks included in documents based on associated halftone frequency information. The halftone frequency information is unknown.

The term "document" refers to any document having confidential information or otherwise confidential for individual users, organizations, nation, or the like. Various examples of such confidential documents may be, but not limited to, cheques, legal documents, bank bonds, research data, contract documents, prescriptions, coupons, tickets, invoices, or disclosure documents. These are few examples, but the document can be any document which is confidential to the user. In context of the current disclosure, the document includes security marks such as IR (Infrared) marks, The document may further include content in the form of text, image, graphics, or a combination thereof. The document is in the form of printed version of the document.

The term "security mark" refers to a mark added/printed/ embedded in the document to ensure its authenticity/genuineness/originality/confidentiality. In the context of the disclosure, the security mark refers to an invisible security mark. The security mark can be in the form of text, or image. The security mark can be referred to as IR security mark, or IR mark.

The term "security mark portion" refers to include a background region and an actual IR security mark, also referred to as IR security marked region, or IR marked region. The security mark portion refers to an area in the document where the security mark is present along with background or covered with invisible color/ink and so on.

The term "location information" refers to a location/place where the IR security mark is present in the document. The location information can be in the form of top left corner of the document, top right corner of the document, bottom left corner, or bottom right corner. These are few examples; other possible location information can be used for implementing the disclosure.

Overview

The present disclosure discloses methods and systems for automatically detecting IR security marks without using/ requiring any dedicated devices such as IR scanners, IR cameras or the like. Instead, the present disclosure proposes to use existing devices such as multi-function devices to detect IR security marks, thereby eliminating the need of dedicated IR scanners or dedicated IR light source devices. The multi-function device detects IR security marks based on halftone frequency information, the halftone frequency information may be unknown to the multi-function device and can be further estimated using various methods/techniques, Based on the estimated halftone frequency information and comparison with threshold halftone frequencies, the multi-function device identifies the IR security mark in a document, extracts the IR security mark and compares it with one or more pre-stored reference IR security marks. If matches, the multi-function device successfully detects the presence of IR security marks in the document. This way, the methods and systems detect IR security marks in the confidential document without using any dedicated IR scanners/ devices.

Exemplary Environment

FIG. 1 shows an exemplary environment 100 in which various embodiments of the disclosure can be practiced. The environment 100 includes a multi-function device 102 that provides one or more functionalities such as printing, scanning, imaging, copying, and so on. The multi-function device 102 as shown is just one example but the environment 100 may include scanners, mobile devices, or any devices with scanning functionalities.

In context of the present disclosure, the multi-function device 102 automatically identifies/detects an infrared (IR) security mark in a document to determine the authenticity/ genuineness/originality/confidentiality of the document.

Typically, the document can be any confidential document or otherwise confidential for a user and/or for an organization. The document includes content in the form of text, image, graphics, or a combination thereof. In context of the current disclosure, the document includes a security mark. The security mark may be present in all pages of the document or may be present on a particular page of the document such as starting page of the document, last page of the document or the like. The security mark is added to the document using printing mechanisms such as halftone printing. The security mark may be an invisible security mark such as infrared (IR) security mark. For the sake of discussion, the disclosure will be discussed with respect to IR security mark without limiting the scope of disclosure.

In one example, the IR security mark may be a text-based security mark. The IR security mark may include alphabets, numbers, special characters, or a combination thereof. The IR security mark may represent a name of an organization that issues the document, for example, bank name. In another example, the IR security mark may be common phrases to indicate that the document is a confidential document. Few such exemplary security marks include, "confidential", "secure", "protected", "confidential and privileged" and so on.

In implementation, a user submits a document including an IR security mark, at the multi-function device 102. The multi-function device 102 receives input from the user such as location of the IR security mark in the document, extracts the IR security mark portion based on the input, calculates one or more halftone frequencies associated with the security mark portion, compares the calculated halftone frequencies with threshold halftone frequency values to correctly identify the IR security mark and extracts the IR security mark. Here, the threshold halftone frequencies are also calculated using a pre-defined formula i.e., based on mean and standard deviation value, discussed below in more detail. The multi-function device 102 then compares the extracted IR security mark with one or more pre-stored IR security marks to detect the presence of IR security mark in the document. The IR security mark may be detected to determine whether the document submitted at the multi-function device 102 is a confidential document. The IR security mark may be detected to determine whether the document is an original document. The security mark may be detected to determine whether the document is a genuine document. These are few examples, but many other variations may be implemented. More implementation and structural details will be discussed below in conjunction with FIG. 2.

The disclosure can be implemented for various organizations, individuals or anywhere, where genuineness/originality/confidentiality of the documents needs to be determined. Few examples of such organizations include without limiting such as banks, colleges, schools, corporate offices, passport offices, immigration departments, or the like for various purposes. As one example, banks deal with confidential documents such as bonds, cheques, affidavits, etc. In another example, corporate offices deal with invoices, contract-related documents, research and development related documents, legal documents, negotiable documents, prescriptions, or the like. Immigration offices deal with passports and other identity-related documents. Schools and colleges deal with mark sheets, passing certificates, or the like.

In cases where the disclosure is implemented by an organization, the user may be any employee or an admin user of the organization who submits the document for scanning at the multi-function device 102 to verify the document's authenticity/genuineness/confidentiality. The user uses the multi-function device 102 to determine whether the document is a confidential document or not. Alternatively, an individual user may also use the multi-function device 102 for any of his document (as received) whether the document is an original document or not.

Exemplary Flowchart

Figure 2:
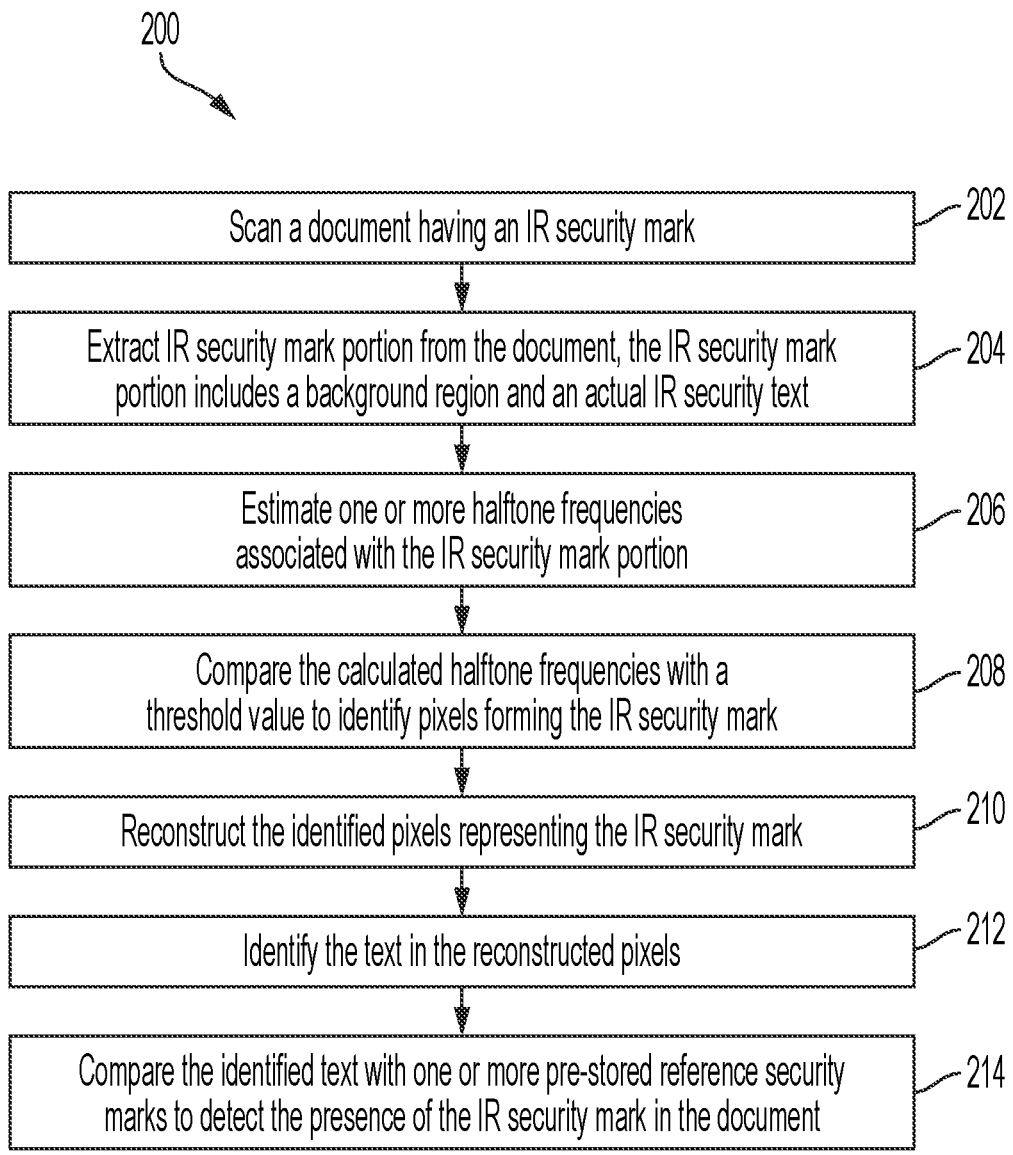

FIG. 2 is an overall method flowchart 200 for detecting the presence of an IR security mark in a document for further assessment. The method 200 may be implemented at a multi-function device such as 102 or at a scanner.

The method 200 begins where a user submits a printed version of a document at the multi-function device for scanning. The document includes an IR security mark, the IR security mark is further layered with an invisible color, referred to as a background region. The background region and the IR security mark collectively referred to as IR security mark portion. In an example, it can be considered that the IR security mark portion is printed with halftone printing techniques. The content of the document may be printed using any known or later developed printing techniques.

At 202, the document having the IR security mark is scanned. The scanned document is output in ROB format. The user then provides an input at the multi-function device. Based on the input from the user, at 204, the IR security mark portion is extracted for further processing. Here, the method 200 processes the IR mark security portion instead of the entire document. The IR security mark portion includes a background region and actual IR security mark/text.

The scanned document is then converted into grayscale format. The document from the grayscale format is further converted into a binary image/format. At 206, one or more halftone frequencies associated with the IR security mark portion are estimated or identified. At 208, the calculated halftone frequencies are compared with a threshold value to identify the IR security mark, specifically, pixels forming the IR security mark. This way, the IR security mark is identified and extracted. In detail, adaptive binarization and frequency estimated is implemented to identify the halftone frequencies of the IR security mark and the background region. The process outputs a pair of binary images and respective frequencies. Then, mean value and standard deviation of the frequencies is calculated and is used as a threshold to separate the IR security mark (IR marked region) from the background region. This way, pixels forming the IR security mark/text are identified and extracted. After extraction, at 210, IR security mark pixels are reconstructed using morphological operations and fed to an OCR tool for identifying text representing pixels falling in the IR security mark at 212. Finally, at 214, the identified IR text is compared with one or more pre-stored reference security IR Marks to detect the presence of the IR security mark in the document. If the identified text matches with any of the pre-stored marks, then the document is considered to have an IR security mark. Based on the presence of the IR security mark, it is determined whether the document is a confidential document, original document, genuine document and so on.

Figure 3A:
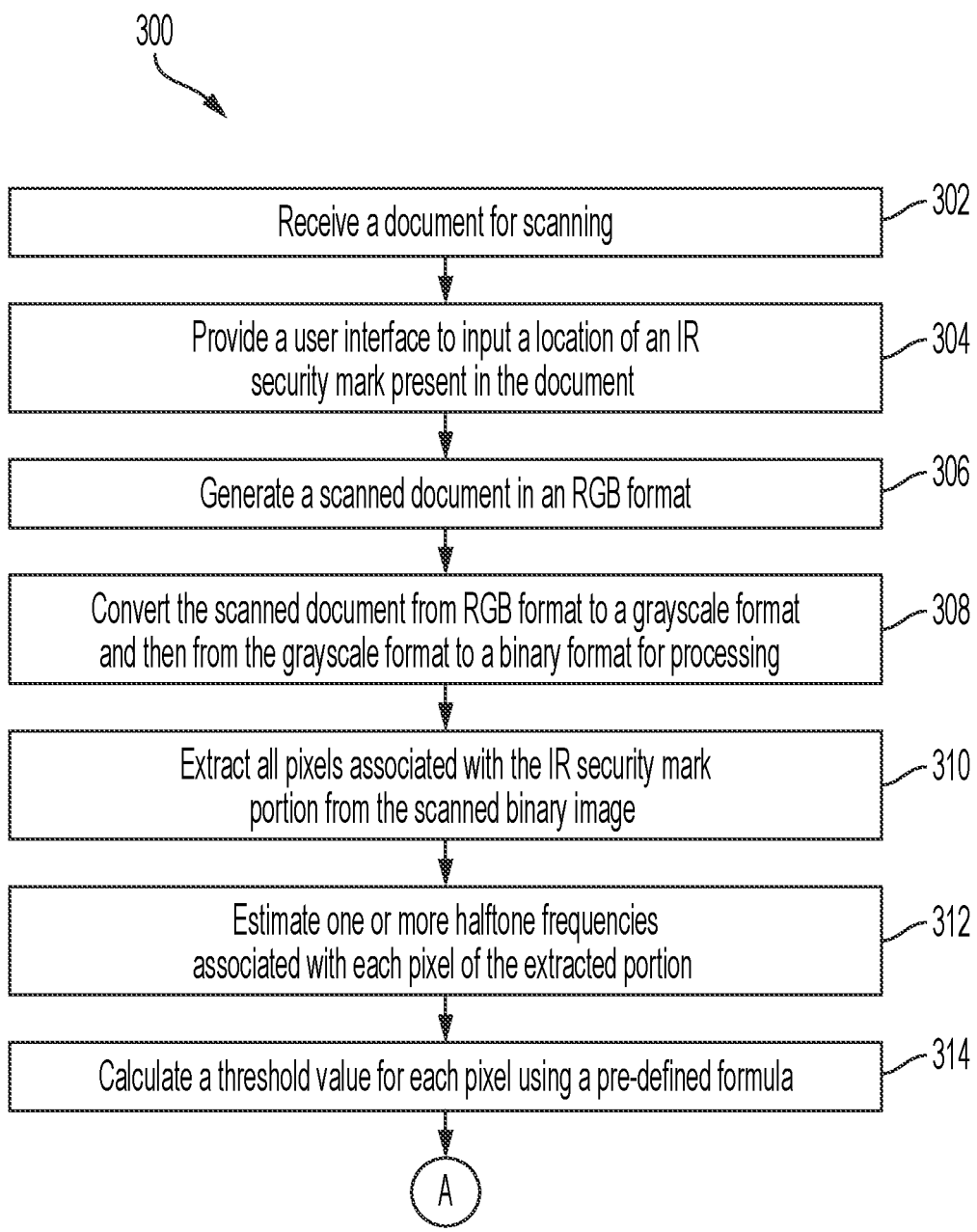
FIGS. 3A and 3B represent a detailed method flowchart for identifying IR security marks in a document.
Figure 3B:
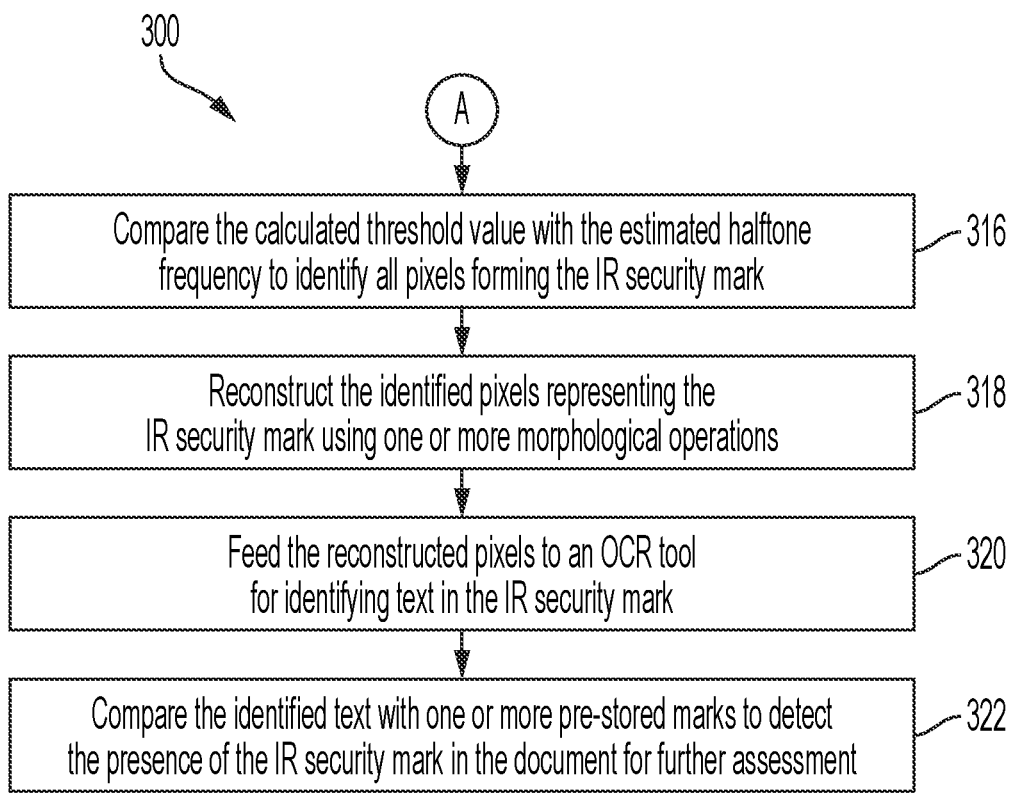

FIGS. 3A and 3B represent an exemplary method flowchart 300 for automatically identifying Infrared (IR) security marks included in documents. The method 300 may be implemented at a multi-function device, such as the multi-function device 102 of FIG. 1 or scanner. Additionally, the method 300 can be implemented at any equivalent device with scanning functionality.

Figure 4A:
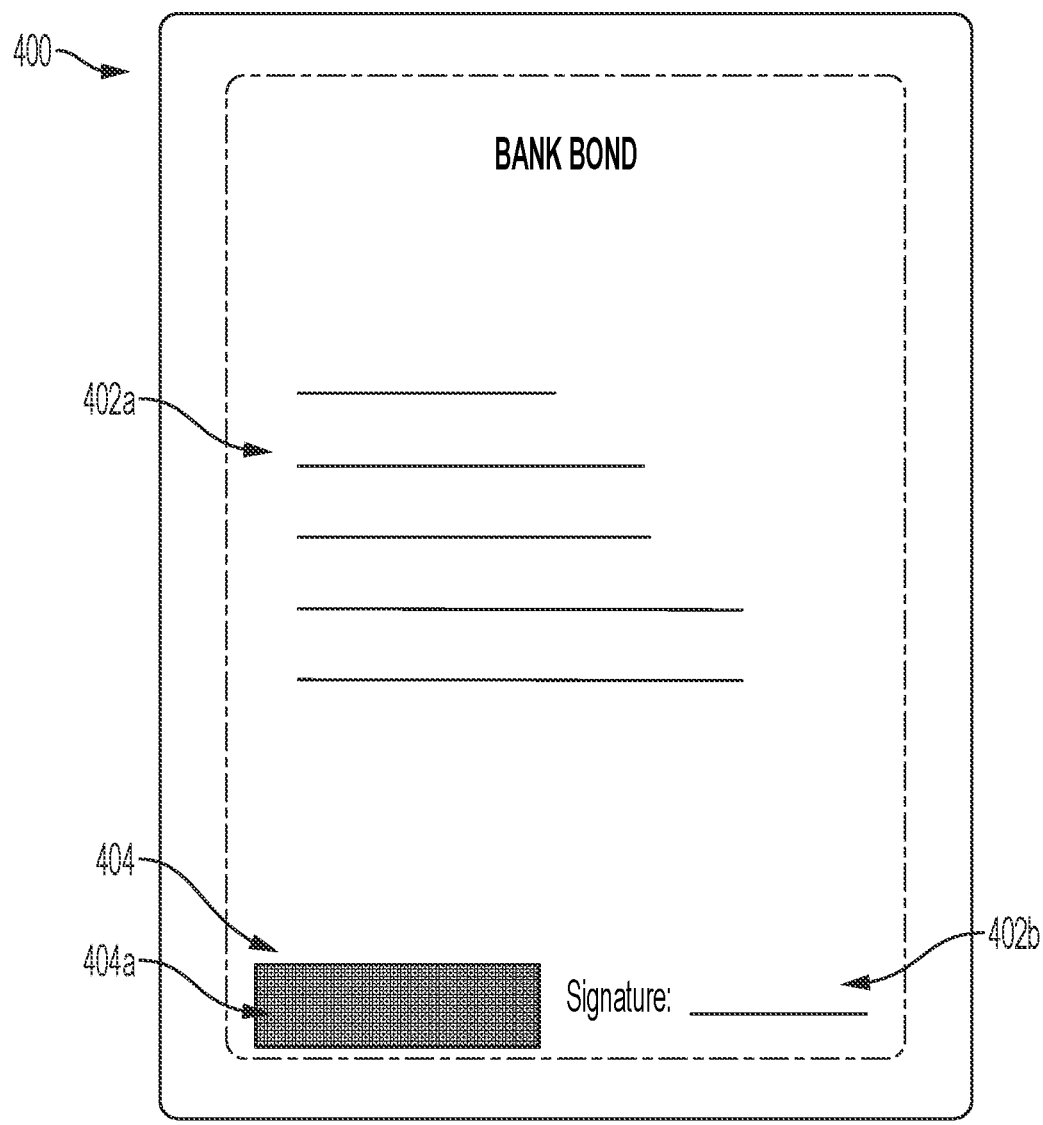
FIGS. 4A, 4B, and 4C are exemplary snapshots illustrating the implementation of the present disclosure.

The method 300 begins when a user wishes to know whether a document includes any IR security mark or not. The document includes content in the form of text, graphics, images, or a combination thereof. In context of the current disclosure, the document includes an IR security mark. One such exemplary snapshot of the document 400 is shown in FIG. 4A. The document 400 represents a bank bond, having confidential content marked as 402*a* and 402*b*. The document 400 includes an IR security mark hidden (not shown) with a colored or otherwise background portion 404*a*, collectively referred to as an IR security mark portion 404. The IR security mark and the colored background region/portion are printed using any printing mechanism/technique. One such example is halftone printing, The IR security mark portion is printed before printing content on the document or can be printed after content of the document is printed. The user submits the document at the multi-function device for processing. The document submitted at the multi-function device is in a printed version. Alternatively, the document at the multi-function device may be submitted in a digital form.

At 302, the document at the multi-function device is received for scanning. A user interface is provided to the user with several options such as scan workflow, print workflow, copy workflow, form workflow, and so on. In context of the current disclosure, the user interface includes an option security mark workflow option. The user selects the security mark option which is received by the multi-function device. Upon selection of the security mark option, a user interface is further provided to the user to input a location of the IR security mark embedded/present in the document, at 304. For example, a drop-down menu may be displayed to the user including one or more options such as a header, a footer, a top right corner, a top left corner, a bottom right corner, or a bottom left corner. The user can select any of the locations where the security mark is present in the document, For example, if the security mark is present in the top left corner of the document, the user selects the option top left corner. But if the security mark is present in the footer, the user selects the option footer from the drop-down menu. In some implementations, the location of the IR security mark may be automatically detected by the multi-function device 102. This way, the location of the IR security mark is identified.

The user then initiates scanning of the document by pressing a scan button on the multi-function device 102 or through the user interface. At 306, the document is scanned to generate a scanned document in any pre-defined format for example, RGB format for further processing, The RGB format is a pixel format of the scanned document where each pixel of the document has a pixel value corresponding to R channel, G channel and B channel. At 308, the RGB format of the scanned document is further converted into greyscale format i.e,, black, and white format. The grayscale format again is representation of the data in pixel format. The grayscale format is further converted into binary format for further processing.

At 310, the IR security mark portion is extracted from the complete data of the scanned document. The IR security mark portion includes a background region and an actual IR security mark. The extracted portion is the pixel representation of the actual data. The IR security mark portion is extracted based on the location as input by the user. Specifically, all pixels associated with the IR security mark portion are extracted from the scanned binary image for processing. At 312, one or more halftone frequencies associated with each pixel of extracted portion are calculated/estimated. The halftone frequencies can be estimated using one or more methods and one such method is discussed below in detail.

Here, first, an intensity value of each pixel of the extracted portion is compared with one or more threshold values. Based on the comparison, a new intensity value is assigned to each pixel of the extracted portion. The new intensity value is any of the values from 255, 128, or 0. Further, the threshold is calculated using a mean and a standard deviation of the intensity values of the pixels. After assigning the new intensity value to each pixel, a pair of new variables, i.e., Out-max and Out-min, are defined for each pixel of the extracted portion. The value of the variables for each pixel of the extracted portion is calculated based on the new intensity value of the pixel. For example, if the new intensity value of the pixel is 255, the pixel is identified as a maxima pixel and pre-defined values '1' and '0' are assigned to the variables Out-max and Out-min, respectively. In another example, if the new intensity value is 128, the pixel is identified as a minima pixel and a value '0' is assigned to both the variables Out-max and Out-min. In further example, if the new intensity value is neither 255 nor 128, the value '0' is assigned to the variable Out-max and the value '1' is assigned to the variable Out-min. This way, the pre-defined values are assigned to the variables Out-max and Out-min for each pixel of the extracted portion. Then, two binary images are formed from the extracted portion i.e., a first binary image and a second binary image. The binary images are created based on the values of the variables Out-max and Out-min associated with the pixels of the extracted portion. In the first binary image, the intensity value of each pixel is assigned according to the value of the variable Out-max of the corresponding pixel in the extracted portion. In the second binary image, the intensity value of each pixel is assigned according to the value of the variable Out-min of the corresponding pixel in the extracted portion. This way, two binary images are obtained.

Then, halftone frequencies are calculated for each binary image. To calculate the frequency of each pixel, number of active pixels, i.e., pixels with intensity value '1', within a pre-defined neighborhood of each pixel is counted. For this, a pre-defined window of any suitable number of pixels is selected. The size of the window is selected based on the size, i.e., the number of cells of the image for which the halftone frequencies are calculated. In one example, if the size of the image is 64*64 cells, then a window of 16-16 pixels is selected and to calculate the frequency, the number of active pixels is counted in the 16*16 neighborhood of each pixel. This way, the frequency for each pixel of both the binary images is calculated. Further, for each pixel of the first binary image, another variable Freq-max is defined that stores the frequency calculated for the corresponding pixel. Similarly, for each pixel of the second binary image, a variable Freq-min is defined that stores the frequency calculated for the corresponding pixel. This way, two binary images and frequency corresponding to each pixel of the binary images is calculated. This way, frequencies are calculated, and the calculated frequencies are then multiplied with the DPI/LPI (Dots/LPI per Inch) of the multi-function device 102 to obtain the halftone frequency. For example, the multi-function device 102 may have 300 DPI, 600 DPI and so on.

At 314, a threshold value is calculated for each pixel of the binary images using a pre-defined formula as outlined below. Once calculated, at block 316, the calculated halftone frequencies are compared with calculated threshold values to identify pixels representing the IR security mark. Here, the calculated halftone frequency for each pixel is compared with the calculated threshold value for each pixel. Based on the comparison, pixels representing the IR security mark are separated from the background region. More details are discussed below.

In one example, the threshold value for each binary image is calculated based on a mean and standard deviation of the calculated halftone frequencies of pixels of the corresponding binary image. The threshold value "Threshold-1" is calculated for the first binary image using equation 1, where the threshold value "Threshold-1" is calculated based on the calculated mean (M) and standard deviation (S) of the halftone frequencies of pixels of the first binary image.

$$\text{Threshold-1} = (M(\text{Freq-max}) - 0.5 * S(\text{Freq-max})) \qquad (1)$$

Similarly, the threshold value "Threshold-2" is calculated for the second binary image using equation 2, where the threshold value "Threshold-2" is calculated based on the calculated mean (M) and standard deviation (S) of the halftone frequencies of pixels of the second binary image.

$$\text{Threshold-2} = (M(\text{Freq-min}) - 0.5 * S(\text{Freq-min})) \qquad (2)$$

Figure 4B:

Once the threshold values are calculated for both the binary images, the calculated halftone frequency of each pixel of both the binary images is compared with the respective threshold value calculated for the corresponding binary image. The halftone frequency "Freq-max" of each pixel of the first binary image is compared with the calculated threshold value "Threshold-1" and accordingly the pixels of the first binary image containing the IR security mark are identified. In one example, the halftone frequency "Freq-max" of each pixel is compared with the calculated threshold value "Threshold-1" and based on the comparison, the intensity value of all the pixels for which the halftone frequency "Freq-max" is greater than the "Threshold-1" is set as '0' and the pixels are identified as background pixels. This way an updated first binary image is obtained in which all the pixels for which calculated halftone frequency is greater than the threshold value is identified as background pixels and their intensity is set as '0', i.e., black pixels and remaining pixels are identified as foreground pixels or pixels having IR security mark. Similarly, for the second binary image, the calculate halftone frequency "Freq-min" of each pixel is compared with the calculated threshold value "Threshold-2" and accordingly the pixels of the second binary image representing the IR security mark are identified. In one example, the halftone frequency "Freq-min" of each pixel is compared with the calculated threshold value "Threshold-2" and based on the comparison, the intensity value of all the pixels for which the halftone frequency "Freq-min" is greater than the "Threshold-2" is set as '0' and the pixels are identified as background pixels. This way an updated second binary image is obtained in which all the pixels for which halftone frequency is greater than the threshold value is identified as background pixels and their intensity is set as '0', i.e., black and the remaining pixels are identified as foreground pixels or pixels containing IR security mark. Once all the pixels containing the IR security marks are identified in both the binary images and the updated binary images are obtained successfully, both the binary images are combined to create a combined binary image of the IR security mark. In one example, the updated first binary image is ORed with the updated second binary image to obtain the combined binary image. In the final/combined binary image, where all white pixels are present represent/form the IR security mark and the black pixels represent the background region. Based on the halftone frequencies estimation and comparison, it can be determined whether pixels falling in the IR security mark portion represent the background region or the IR security mark. As one example, if the estimated halftone frequency of a pixel is less than a threshold value, then the pixel failing in the IR security mark portion is classified as a part of the IR security mark. This way, the pixels containing the IR security mark are identified. One such exemplary snapshot of a binary image such as 406, obtained after processing is shown in FIG. 4B. The binary image 406 shows a white portion 408 representing white pixels, i.e., pixels containing IR security mark and includes a black portion 410 representing black pixels, i.e., pixels including a background portion/region.

Once identified, at block 318, the identified pixels representing the IR security mark are reconstructed using one or more morphological operations. The morphological operations are performed on the combined binary images (final binary image) to enhance the white pixels, i.e., pixels containing IR security mark, by removing/reducing noise and by enhancing the subject of interest (in this case IR security text). To accomplish this, one or more structuring elements are applied to the pixels of the combined binary image. The size and shape of the structuring element are selected based on the size of the input image (in this case the final binary image) and the size and shape of the subject/feature to be enhanced. An exemplary structuring element can be a matrix of 7*7 cells with all ones or a matrix of 5*5 cells of all ones. The structuring elements are used in performing erosion and dilation operation to enhance the white pixels, i.e.. pixels containing IR security text. In one example, the morphological operations are performed using equation 3:

$$\text{Combined\_binary\_morph} = ((((\text{Combined\_binary} \oplus SE1) \ominus SE2) \oplus SE1) \oplus SE1) \quad (3)$$

Figure 4C:

In the equation 3, the "Combined_binary" represents an input image, "Combined_binary_morph" represents an output image obtained after performing the morphological operations, SE1 represents the first structuring element and SE2 represents the second structuring element. To enhance the subject of interest (i.e., IR security mark) in the input image, the dilation is performed using a first structuring element SE1, which is a 77 matrix of all ones, thereafter, the erosion is performed using a second structuring element SE2, which is a 5*5 matrix of all ones. Finally, the dilation is performed twice using the first structuring element SE1 to obtain a reconstructed IR security mark. One such exemplary snapshot of an image 412 obtained after performing the morphological operation is shown in FIG. 4C. The image 412 shows image obtained after reconstructed pixels of the input binary image 406 as shown in FIG. 4B. Here, morphological operations are performed on the input image 406 of FIG. 4B using the structuring elements, e.g., SE1 and/or SE2, the enhanced output image, i.e., the image 412 is obtained. The image 412 includes enhanced white pixels marked as 414, that represent IR security text. This is just one approach, but reconstruction can include any such technique or a combination thereof, to yield the desired result, i.e., enhancing pixels representing the IR security text.

Once pixels having IR security mark, are reconstructed, the reconstructed pixels are analyzed to recognize the IR security mark, i.e., the secure text. Here, the reconstructed pixels are fed to the OCR tool to recognize the text in the IR security mark at 320. This way, the text given in the IR security mark is identified.

At block 322, the identified IR text is compared with one or more pre-stored security marks to identify the presence of the IR security mark in the document.

Few examples of the pre-stored security marks may be, but not limited to, "confidential", "secure document", "IR mark", or the like. If the identified text corresponding to the IR security mark matches with one or more pre-stored security marks, it is considered as a successful match and ascertains the presence of the IR security mark in the document. Based on the successful match, it is considered that the document is an original document or a genuine document. If the identified text does not match with the one or more pre-stored security marks, then it is considered as an unsuccessful match. The presence of the IR security mark in the document can be used for further assessment. In one example, the further assessment may be to determine whether the document is a confidential document. In another example, the further assessment may be to determine whether the document is an original document. In further example, the further assessment may be to determine whether the document is a genuine document.

This way, the method 300 helps identify and detect the IR security mark basis which authenticity or genuineness of the document is determined. The method 300 does not require any dedicated device such as IR scanner but uses the existing multi-function device to detect the IR security mark, which further determines the authenticity, or genuineness of the document.

Exemplary System

Figure 5:
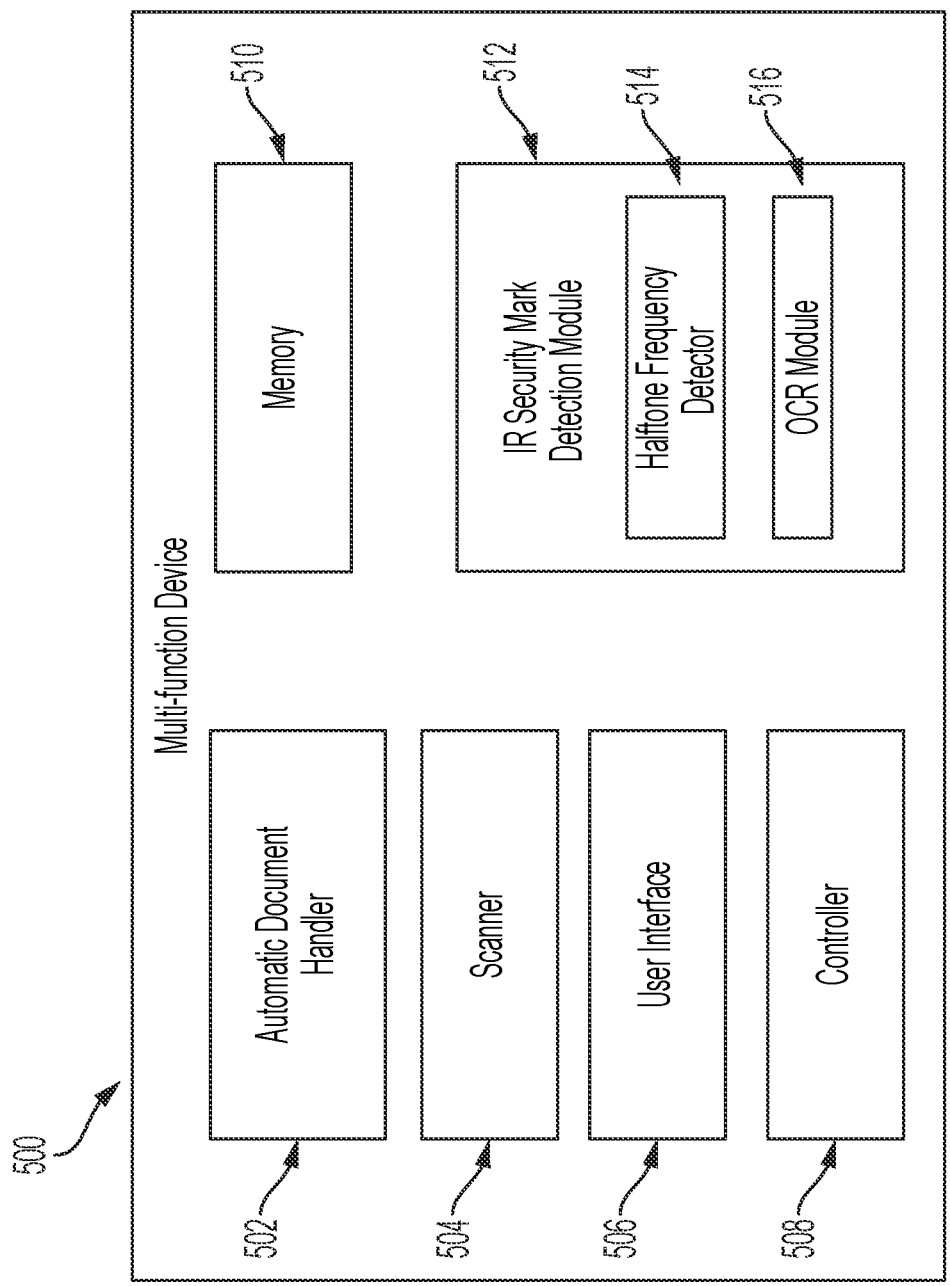
FIG. 5 is a block diagram illustrating various components of a multi-function device, in accordance with an embodiment of the present disclosure.

FIG. 5 is a block diagram of a multi-function device 500 for implementing the current disclosure. As shown, the multi-function device 500 includes an automatic document handler (ADH) 502, a scanner 504, a user interface 506, a controller 508, a memory 510, an infrared (IR) security mark detection module 512, which further includes a halftone frequency detector 514 and an Optical Character Recognition (OCR) module 516. The components 502-516 are connected to each other via a conventional bus or a later developed protocol. The components 502-516 communicate with each other for performing various functions of the present disclosure. The multi-function device 500 may further include additional component(s) as required to implement the present disclosure.

To begin with, a user submits a document having an IR security mark. The document may have one or more pages and may include content in the form of text, image, graphics, or a combination thereof. The IR security mark may be present or embedded anywhere in the document.

Specifically, the user places the document on the automatic document handler 502 for scanning. The controller 508 triggers the scanner 504 for scanning and presents a user interface 506 to the user. The user interface 506 includes one or more options such as scan, print, workflow, copy, fax, and so on. In context of the current disclosure, the user interface 506 includes an option "security mark detection workflow". The option allows the user to detect the presence of the IR security mark included in the document. The user selects the security mark detection workflow option for further processing. The selection of the option is received by the controller 508.

The controller 508 further provides the user interface 506 to the user to input a location of the IR security mark in the document. The user can input the location through the user interface 506. The controller 508 stores the location as input by the user temporarily in the memory 510 of the multi-function device 500, The user then initiates scanning of the document, for example the user can press a scan button provided on the multi-function device 500 or otherwise given on the user interface 506 of the multi-function device 500, The controller 508 triggers the scanner 504 to initiate scanning.

The scanner 504 scans the document and generates a corresponding scanned document. The scanner 504 generates the scanned document in any desirable format for further processing by components 502-516 of the multi-function device 500. One such desirable format of the scanned document is RGB format. Once generated, the controller 508 sends the scanned document in the RGB format to the IR security mark detection module 512 for further processing.

The IR security mark detection module 512 receives the scanned document in the RGB format. The IR security mark detection module 512 converts the scanned RGB image to a grayscale image. The IR security mark detection module 512 further converts the grayscale scanned image into a binary format/image. The binary format/image is the pixel representation of the scanned document, where each pixel has a "0" value or "1" value, After conversion, an intensity value of each pixel of the scanned image varies between 0-255, where each intensity value represents different shades of gray from black to white, e.g., 0 represents black and 255 represents white. Once successfully converted, the IR security mark detection module 512 analyzes the binary image to calculate the halftone frequency of a portion of the scanned document containing the IR security mark, The IR security mark detection module 512, first, identifies a portion of the binary image that contains the IR security mark based on the location of the IR security mark provided by the user. For instance, if the location provided by the user is a footer, then the IR security mark detection module 512 identifies the footer as the portion to include IR security mark, The security mark detection module 512 extracts the identified portion. The extracted portion includes the IR security mark and a background portion/region.

After extraction, the IR security mark detection module 512 calculates frequency of the extracted portion. Specifically, the halftone frequency detector 514 calculates the halftone frequency of each pixel of the extracted portion. In detail, the halftone frequency detector 514, first, compares an intensity value of each pixel of the extracted portion with one or more threshold values and accordingly assigns a new intensity value to each pixel. The new intensity value is either 255, 128, or 0. The halftone frequency detector 514 calculates the threshold value using a mean and standard deviation of intensity values of the pixels of the extracted portion. Once the new intensity value is assigned to each pixel, the halftone frequency detector 514 defines a pair of new variables, i.e., Out-max and Out-min for each pixel of the extracted portion. The halftone frequency detector 514 calculates the value of the variables for each pixel based on the new intensity value of the corresponding pixel. For instance, if the new intensity value of the pixel is 255, the halftone frequency detector 514 identifies the pixel as a maxima pixel and assigns pre-defined values and '1' and '0' to the variables Out-max and Out-min, respectively. Further, if the new intensity value of the pixel is 128, the halftone frequency detector 514 identifies the pixel as a minima pixel and assigs the value '0' to both the variables Out-max and Out-min, if the new intensity value of the pixel is neither 255 nor 128, the halftone frequency detector 514 assigns the value '0' to the variable Out-max and assigns the value '1' to the variable Out-min. This way, the halftone frequency detector 514 assigns the pre-defined intensity values to the variables Out-max and Out-min for each pixel of the extracted portion. Once successfully assigned, the halftone frequency detector 514 creates two binary images, namely a first binary image and a second binary image from the extracted portion. The halftone frequency detector 514 creates the binary images based on the values of the variables Out-max and Out-min assigned to the pixels of the extracted portion. In the first binary image, the halftone frequency detector 514 assigns an intensity value to each pixel according to the value of the variable Out-max of the corresponding pixel in the extracted portion. Similarly, in the second binary image, the halftone frequency detector 514 assigns an intensity value to each pixel according to the value of the variable Out-min of the corresponding pixel in the extracted portion. This way, two binary images are obtained, thereafter, the halftone frequency detector 514 calculates the halftone frequency of each pixel of both the binary images.

To calculate the halftone frequency of each pixel, the halftone frequency detector 514 counts the number of active pixels, i.e., pixels with intensity value '1', within a pre-defined neighborhood of each pixel. For this, the halftone frequency detector 514 selects a pre-defined window of any suitable number of pixels to count the number of active pixels within the pre-defined window, The halftone frequency detector 514 selects the size of the window based on the size, i.e., the number of cells, of the image for which the halftone frequencies are calculated. In one example, if the size of the image is 64*64 cells, then the halftone frequency detector 514 selects a window of 16*16 pixels and accordingly calculates the halftone frequency by counting the number of active pixels in the 16*16 neighborhood of each pixel. This way, the halftone frequency detector 514 calculates the halftone frequency for each pixel of both the image. Further, the halftone frequency detector 514 defines a variable Freq-max for each pixel of the first binary image to store the halftone frequency calculated for the corresponding pixel. Similarly, the halftone frequency detector 514 defines a variable Freq-min for each pixel of the second binary image to store the halftone frequency calculated for the corresponding pixel. This way, the halftone frequency detector 514 creates two binary images and calculates halftone frequency corresponding to each pixel of both the binary images.

Thereafter, the halftone frequency detector 514 compares the calculated halftone frequencies with a threshold value to identify pixels containing the infrared security mark. In detail, first, the halftone frequency detector 514 calculates a threshold value for each binary image. The halftone frequency detector 514 calculates the threshold value for the respective binary images based on a mean and standard deviation of the halftone frequencies of the pixels of the corresponding binary images. Once the threshold value is calculated for each binary image, the halftone frequency detector 514 compares the halftone frequency of each pixel of both the binary images with the respective threshold value calculated for the corresponding binary images. In detail, the halftone frequency detector 514 compares the halftone frequency "Freq-max" of each pixel of the first binary image with the threshold value calculated for the first binary image. Based on the comparison, the halftone frequency detector 514 identifies the pixels containing the IR security mark and the pixels containing background, and accordingly, the intensity values of the pixels are handled, i.e., changed. For instance, if the halftone frequency "Freq-max" of a pixel is greater than the threshold value calculated for the first binary image, the halftone frequency detector 514 identifies the pixel as the pixel containing background and assigns the intensity value '0' to the pixel. This way, the halftone frequency detector 514 creates an updated first binary image and identifies the pixels containing the IR security mark and/or the background. Similarly, the halftone frequency detector 514 compares the halftone frequency "Freq-min" of each pixel of the second binary image with the threshold value calculated for the second binary image. Based on the comparison, the halftone frequency detector 514 identifies the pixels containing the IR security mark and the pixels containing background, and accordingly, the intensity values of the pixels are handled, i.e., changed. For instance, if the halftone frequency "Freq-min" of a pixel is greater than the threshold value calculated for the second binary image, the halftone frequency detector 514 identifies the pixel as the pixel containing background and assigns the intensity value '0' to the pixel. This way, the halftone frequency detector 514 creates an updated second binary image and identifies the pixels containing the IR security mark and/or the background.

Once the pixels containing the IR security marks are identified in both the binary images, the halftone frequency detector 514 combines both the binary images to create a combined binary image or a final binary image. In one example, the halftone frequency detector 514 applies an OR operation to both the first binary image and the second binary image to obtain the combined binary image. This way, a single final binary image is obtained. In the single binary image, all the white pixels represent IR security mark, and all black pixels represent background region. Based on the estimated halftone frequencies and the comparison, the halftone frequency detector 514 classifies the pixel into a pre-defined category i.e., whether the pixel belongs to the background region or the actual IR security text. For example, if the value of the pixel is greater than 175 LPI, the pixel is considered as a background region, If the value of pixel is less than 175 LPI, the pixel is considered as actual IR text. This way, the halftone frequency detector 514 identifies all pixels representing the IR security mark and extracts all identified pixels for further processing.

Thereafter, the IR security mark detection module 512 reconstructs the identified pixels containing the IR security mark using morphological operations. The IR security mark detection module 512 performs the morphological operations on the combined binary image to enhance the white pixels, i.e., pixels containing IR security mark, by removing/reducing noise and by enhancing the subject of interest. To accomplish this, the IR security mark detection module 512 applies one or more structuring elements to the pixels of the combined binary file/image. The structuring element is a matrix of multiple cells with one or more ones and zeros. An exemplary structuring element can be a matrix of 7*7 cells with all ones or a matrix of 5*5 cells of all ones. The IR security mark detection module 512 uses the structuring elements to perform erosion and dilation operation to enhance the white pixels, i.e., pixels having/representing IR secure text.

Once the white pixels, i.e., pixels containing IR security mark, are reconstructed, the IR security mark detection module 512 passes the reconstructed pixels representing the IR security mark to an OCR module 516. The OCR module 516 performs an OCR operation to clearly recognize the IR security mark, i.e., the IR security text.

Once the IR security mark text is recognized, the IR security mark detection module 512 compares the recognized IR security mark with a one or more pre-stored security marks to ascertain the presence of the IR security mark in the document for further assessment. If the identified IR text matches with any of the pre-stored IR marks, then the document includes the IR security mark. The document is considered for further assessment. The assessment may be to determine whether the document is a confidential document. The assessment may be to determine whether document is a genuine document. The assessment may be to determine whether the document is an original document, If the identified IR text does not match with any of the pre-stored marks, the match is considered as unsuccessful. As a result, it is considered that the document is considered as a modified document i.e., not an original document and so on.

Based on the matching, the IR security mark detection module 512 sends the output to the controller 508. The controller 508 displays a notification to the user through the user interface 506. For example, the notification may indicate the document is an original or not. In another example, the notification may indicate that the document does not include any IR security mark and hence is not a confidential document. In further, example, the notification may be a message displaying that—the document includes an IR security mark.

Continuing with FIG. 5 description, the user interface 506 displays various information/message/notification/options to the user. The user interface 506 may display a message to the user related to whether the document includes an IR security mark. The user interface 506 also allows the user to provide various inputs required for implementing the current disclosure. For example, the user interface 506 allows the user to select a desired option from various options displayed.

The memory 510 stores all relevant information required for implementing the current disclosure. For example, the memory 510 temporarily stores location information related to IR security mark as received from the user. Further, the memory 510 stores one or more IR marks that are typically used to protect the document. Any details stored in the memory 510 may be retrieved by the IR security mark detection module 512, or by the controller 508 for implementing the current disclosure.

The present disclosure discloses methods and systems for automatically identifying/detecting IR security marks in documents based on unknown halftone information. The halftone frequency information is estimated using one or more methods. The presence of the IR security mark is identified to determine (i) authenticity of the document, (ii) genuineness of the document, (iii) whether the document is an original document, (iv) whether the document is confidential document, or (v) whether the document is a secure document. The methods and systems help identifying the IR security marks in the document without using any special or dedicated devices such as IR scanners, IR cameras or IR fight sources. Instead, the disclosure leverages on the existing devices such as mufti-function devices or scanners to identify the IR security marks in the document based on halftone frequency information. The methods and systems detect IR halftone mark from scanned images or scanned documents. The methods and systems automate the IR mark detection from the estimated frequency information. The methods and systems propose a new workflow to detect/read/identify IR marks. The methods and systems automate the existing method in copy/scan path for IR mark detection.

The present disclosure incorporates content related to halftone frequency estimation as disclosed in U.S. Pat. No. 9,628,635, titled "Systems and methods for halftone frequency detection" in the name of Xerox corp; U.S. Pat. No. 7,424,151, titled "Method and system for image classification and halftone frequency detection" in the name of Xerox corp; U.S. Patent Publication No. 20080239342A1, "Method and system for detection of binary halftone frequencies", in the name of Xerox corp, the entire content of which is incorporated by reference as if fully set forth herein. These are just few examples, but any other known or later developed methods/systems may be implemented to estimate halftone frequencies for the present disclosure.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, estimating, calculating, determining, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for detecting Infrared (IR) security mark based on unknown halftone frequency information, the method comprising:
    receiving a document from a user, comprising an IR security mark;
    scanning the document;
    detecting the IR security mark by:
        estimating one or more halftone frequencies associated with the IR security mark portion;
        based on the estimation, classifying the IR security mark portion into a background region and the IR marked region comprising the IR security mark;
        identifying the IR security mark; and
        comparing the identified IR security mark with one or more pre-stored IR security marks to ascertain the presence of the IR security mark in the document for further assessment.

2. The method of claim 1, further comprising, providing a user interface to the user to input a location of the IR security mark in the document.

3. The method of claim 1, further comprising, extracting the IR security mark.

4. The method of claim 1, further comprising, reconstructing pixels falling in the IR marked region to identify content in the IR security mark.

5. The method of claim 1, further comprising, performing an Optical Character Recognition (OCR) to identify the content in the IR security mark.

6. The method of claim 1, further comprising, estimating the one or more halftone frequencies associated with the IR security mark portion using one or more methods.

7. The method of claim 1, further comprising, comparing the estimated one or more halftone frequencies with threshold halftone frequencies to determine whether pixels falling in the IR security mark portion represent the background region or the IR security mark.

8. The method of claim 1, further comprising, if the estimated halftone frequency is less than a threshold value, then classifying pixels failing in the IR security mark portion as a part of the IR security mark.

9. The method of claim 1, further comprising, calculating threshold halftone frequencies using a pre-defined formula.

10. The method of claim 1, wherein further assessment comprises at e one of:
    determining whether the document is a confidential document;
    determining whether the document is an original document; or
    determining whether the document is a genuine document.

11. A multi-function device for detecting Infrared (IR) security mark based on halftone frequency information, the multi-function device comprising:
    an automatic document handler (ADH) for receiving a document from a user, comprising an IR security mark;
    a scanner for scanning the document; and
    an IR security mark detection module for:
        estimating one or more halftone frequencies associated with the IR security mark portion;
        based on the estimation, classifying the IR security mark portion into a background region and the IR security mark;
        identifying the IR security mark;
        identifying pixels falling in the IR security mark portion to identify the content in the IR security mark; and
        comparing the identified content with one or more pre-stored IR security marks to ascertain the presence of the IR security mark in the document for further assessment.

12. The multi-function device of claim 11, further comprising, a user interface provided to the user to input a location of the IR security mark in the document.

13. The multi-function device of claim 11, wherein the IR security mark detection module is for reconstructing the identified pixels in the IR security mark using one or more morphological operations.

14. The multi-function device of claim 11, further comprising an Optical Character Recognition (OCR) module to identify the content in the IR security mark.

15. The multi-function device of claim 11, wherein the IR security mark detection module is for comparing the estimated one or more halftone frequencies with threshold halftone frequencies to determine whether pixels falling in the IR security mark portion represent the background region or the IR security mark.

16. The multi-function device of claim 11, wherein the IR security mark detection module is for, if the estimated halftone frequency is less than a threshold value, then classifying pixels failing in the IR security mark portion as a part of the IR security mark.

17. The multi-function device of claim 11, wherein the IR security mark detection module is for calculating threshold halftone frequencies using a pre-defined formula.

18. The multi-function device of claim 11, wherein further assessment comprises at least one of:
- determining whether the document is a confidential document;
- determining whether the document is an original document; or
- determining whether the document is a genuine document.

19. A method for detecting Infrared (IR) security mark based on unknown halftone frequency information, the method comprising: at a multi-function device:
- receiving a document from a user comprising an IR security mark;
- providing a user interface to a user to input a location of the IR security mark in the document;
- scanning the document comprising the IR security mark;
- calculating one or more halftone frequencies associated with the IR security mark portion;
- based on the calculation and comparison, classifying the IR security mark portion into a background region and the IR security mark;
- identifying the IR security mark from the IR security mark portion;
- identifying pixels falling in the IR security mark using one or more morphological operations;
- performing an Optical Character Recognition (OCR) to identify the text in the IR security mark;
- matching the identified text with one or more pre-stored IR security marks; and
- based on the matching, successfully detecting the presence of the of IR security mark in the document.

20. The method of claim 19, further comprising, calculating threshold halftone frequencies using a pre-defined formula.

21. The method of claim 19, further comprising, comparing the estimated one or more halftone frequencies with threshold halftone frequencies to determine whether pixels falling in the IR security mark portion represent the background region or the IR security mark.

* * * * *